Figure 3:
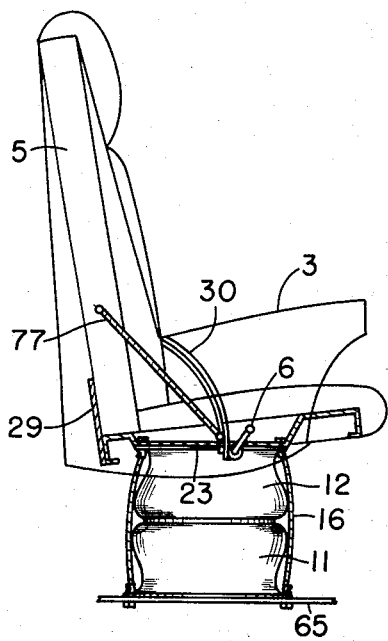

Sept. 13, 1960          I. I. PINKEL          2,952,304

BACK STRUCTURE FOR CRASH RESISTANT SEAT

Original Filed April 25, 1955          5 Sheets-Sheet 1

INVENTOR
ISADORE I. PINKEL

BY

ATTORNEY

Sept. 13, 1960

I. I. PINKEL 2,952,304

BACK STRUCTURE FOR CRASH RESISTANT SEAT

Original Filed April 25, 1955

5 Sheets-Sheet 2

INVENTOR
ISADORE I. PINKEL

BY

ATTORNEY

Sept. 13, 1960 I. I. PINKEL 2,952,304
BACK STRUCTURE FOR CRASH RESISTANT SEAT
Original Filed April 25, 1955 5 Sheets-Sheet 4

INVENTOR
ISADORE I. PINKEL

BY

ATTORNEY

Sept. 13, 1960     I. I. PINKEL     2,952,304
BACK STRUCTURE FOR CRASH RESISTANT SEAT Original Filed April 25, 1955     5 Sheets-Sheet 5

INVENTOR
ISADORE I. PINKEL

ATTORNEY

United States Patent Office 2,952,304
Patented Sept. 13, 1960

2,952,304

BACK STRUCTURE FOR CRASH RESISTANT SEAT

Isadore I. Pinkel, Cuyahoga County, Ohio
(4671 W. 210th St., Fairview Park, Ohio)

Original application Apr. 25, 1955, Ser. No. 503,840, now Patent No. 2,916,081, dated Dec. 8, 1959. Divided and this application Apr. 28, 1959, Ser. No. 814,126

5 Claims. (Cl. 155—179)

(Granted under Title 35, U.S. Code (1952), sec. 266)

The invention described herein may be manufactured and used by or for the Government of the United States of America for governmental purposes without the payment of any royalties thereon or therefor.

This invention relates to a seat construction and more specifically to a passenger seat for use in aircraft and other conveyances that can hold the passenger safely in a crash and reduce the magnitude of peak forces that are imposed on passengers in conventional seats in a crash.

This application is a division of my copending application Serial No. 503,840, filed April 25, 1955, now Patent No. 2,916,081, for Crash Resistant Seat.

Analysis of data on injuries and fatalities sustained in airplane crashes shows that the greatest percentage of fatalities and severe injuries occur when the aircraft seat fails to hold the passenger in place because the seat belt fails, the seat breaks or the seat rips loose from the floor attachments. Under these circumstances the passenger becomes a free projectile within the decelerating airplane. Serious or fatal injuries result when the passenger strikes sharp objects, airplane structure, or other passengers within the airplane. Many of these sharp objects are provided by the broken seats. Bayonetting of passengers by broken tubular metal structural members of airplane seats that failed in the crash is a frequent occurrence. Similar hazards exist in the crash of other means of conveyance.

Many current aircraft seats are rated to withstand forces associated with accelerations of 9 g's corresponding to a load in pounds of 1800 pounds for a 200-pound passenger. Measurements of loads imposed by a passenger on his seat in the actual crash of full-scale aircraft under controlled experimental conditions have shown that the loads transmitted to aircraft seats could be as high as 20 g's without complete collapse of the living space within the fuselage. Current seats can support the design of 9 g deceleration load only if the airplane strikes obstacles in a crash as it moves nose foremost. However, aircraft often swing around in a crash and strike obstacles while moving sideward or rearward. Most current seats rated to withstand a 9 g crash load fail at much lower loads when the airplane strikes obstacles while moving sideward or rearward. Also, because current seats are attached to the fuselage floor and walls at relatively few points, these points are zones of high stress and subject to failure when crash loads are transmitted through these points forming the linkage between the airplane and the seat. Under these circumstances both the seat and passenger become free projectiles in the crash. With the present seat designs, it is not practical to provide additional points of attachment of the seat to the floor to reduce the stress at the points of attachment. Because a stiff metal structure is employed in the frame of conventional seats, distortion of the floor in a crash which changes the distance between the seat attachment points can cause the seat anchorage to fail. This type of failure has been observed even with unoccupied seats.

In a crash the airplane strikes a succession of obstacles as it comes to rest over 400 feet or more of slide path along the ground. Aircraft often continue in motion along the ground for four or five seconds. Current seats of rigid structure are often stressed beyond the elastic limit and are distorted when the airplane strikes the first obstacle. The distorted seat no longer has the strength of the original seat, and fails under the load imposed by another obstacle. What is required is a seat structure that will deform elastically under the crash blow over the full design load range and cushion the blow, and then restore itself quickly approximately to its undeformed shape to be in position to absorb the next blow. Moreover, the elastic seat should have sufficient damping to avoid oscillations which subject the passenger to undesirable accelerations as the seat recovers its original shape after elastic deformations produced by airplane impact with an obstacle.

It is, therefore, the object of the present invention to provide a crash resistant seat having the following properties:

(1) Comfort.
(2) Light weight.
(3) The ability to hold a passenger securely in place in crash deceleration in excess of 20 g's, irrespective of the direction of the crash blow.
(4) Sufficient elastic deformation in any direction to absorb the shock of peak loads in order to reduce the crash blow transmitted to the passenger through the seat to values tolerable to people of average physical fitness.
(5) Sufficient mechanical damping to prevent undesirable vibration following elastic deformation of the seat in a crash.
(6) The structure above the seat pan free of unyielding components that are unsafe for head or body blows.
(7) Attachment to the fuselage floor at many points so that the load transmitted from the seat to the floor does not exceed the local floor attachment strength at any attachment point.
(8) A design that permits major distortion of the fuselage floor without failure of the seat attachments to the floor.
(9) Ease of fabrication.
(10) Ease of installation.

Figure 4:
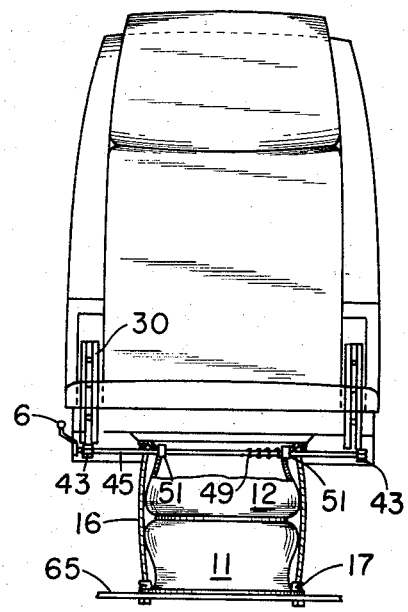
Figure 6:
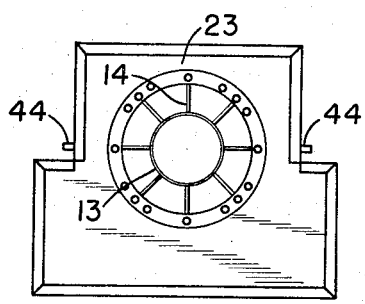
Figure 1:
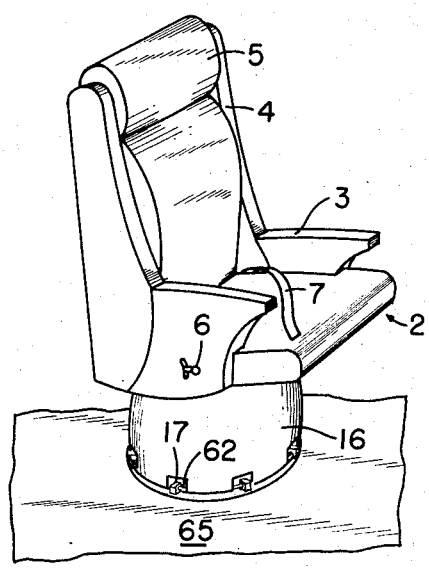
Figure 2:
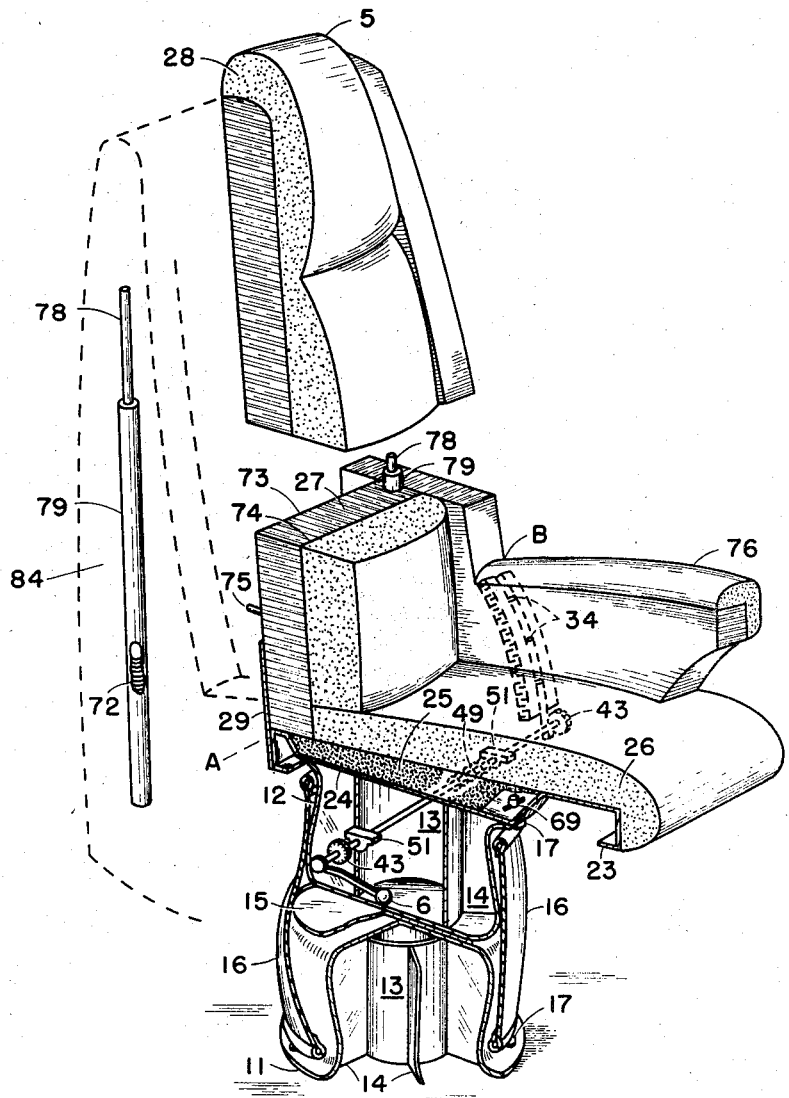
Figure 5:
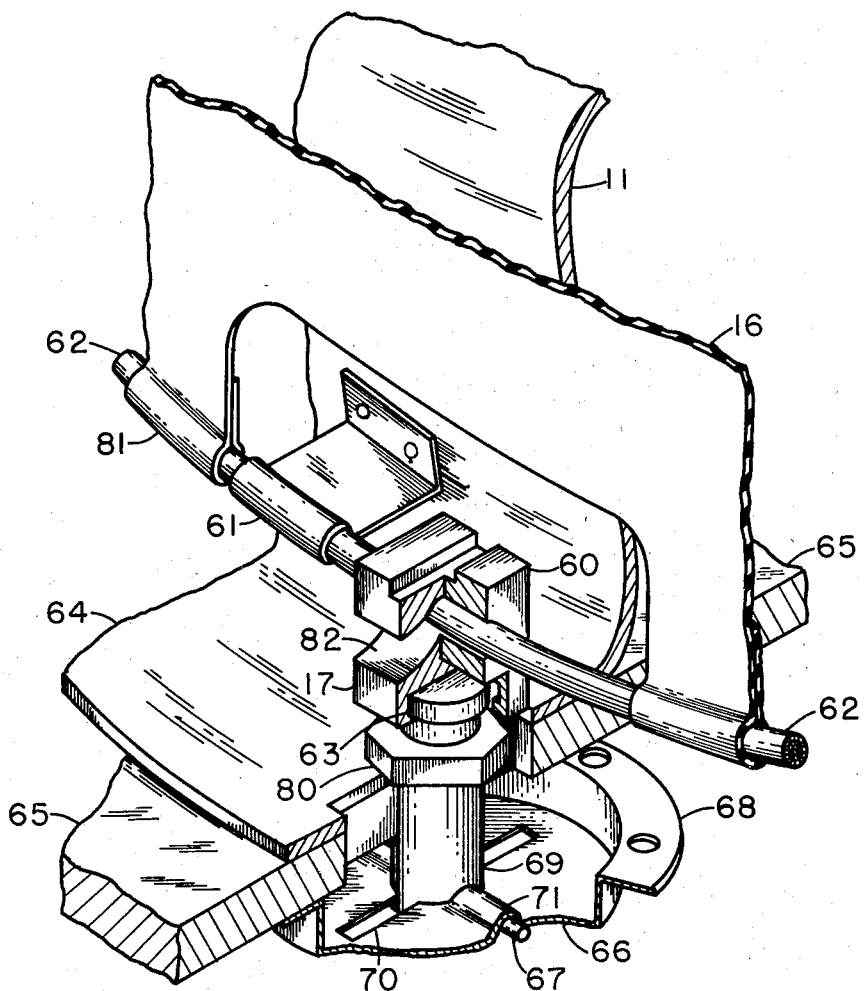
Figure 7:
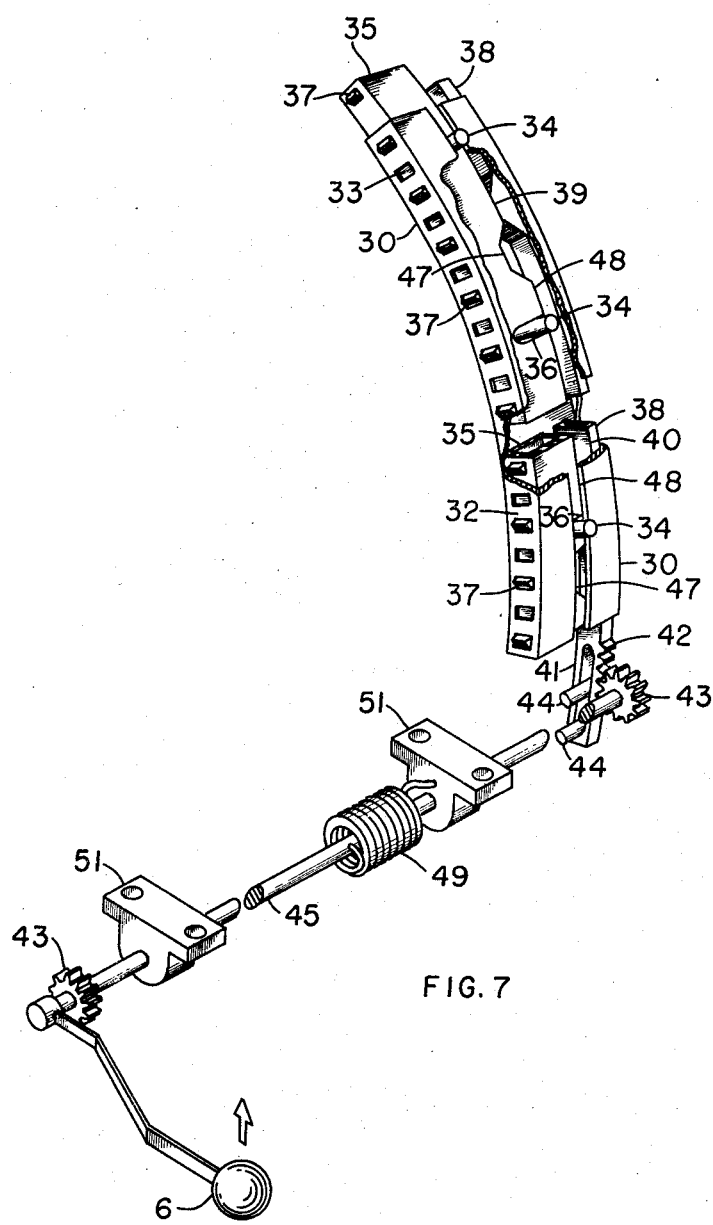
Figure 8:
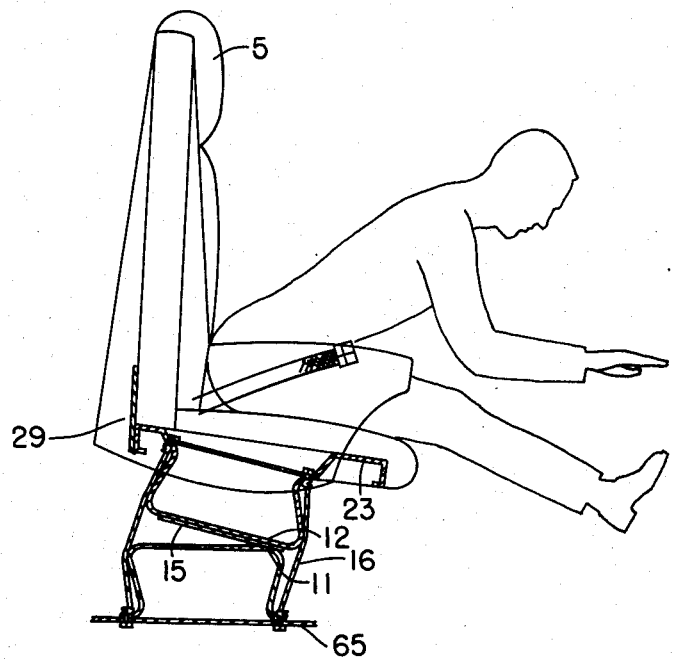
Figure 9:
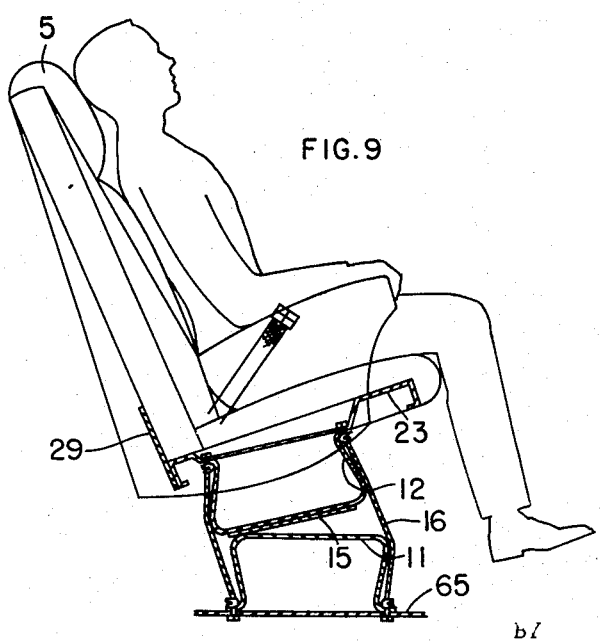

Other objects and advantages of the invention will be apparent as the description proceeds. The following description and drawings show one illustrative embodiment of this invention:

Fig. 1 is a perspective view of a complete seat showing one form of styling that may be used with the basic seat;
Fig. 2 is a cut-away view of Fig. 1, illustrating some of the details of the seat structure;
Fig. 3 is a side schematic view of the seat;
Fig. 4 is a front schematic view of the seat;
Fig. 5 is a detail view of one type of attachment clamp;
Fig. 6 is a plan view of the seat pan;
Fig. 7 is a detail view of one form of seat tilting mechanism; and
Figs. 8 and 9 are diagrammatic sketches illustrating the deformation of the seat under crash conditions.

With reference to Fig. 1, the seat 2 is supported by pedestal 1 which in turn is attached to the airplane floor in a manner to be described. Side arms 3 are attached rigidly to the seat 2 and support ash trays. In order to provide a reclinable seat the seat back 5 is joined to seat 2 in a manner which permits limited rotation of the seat back 5 about the line of juncture of seat back 5 and seat 2. Side flanges 4 are fastened rigidly to seat back 5 and are substantially coextensive with the length of the back 5. The seat back recline control lever 6 protrudes through side arm 3 so as to be readily accessible to the passenger. Seat belt 7 is fastened rigidly to seat 2 and is employed in the customary manner by the passenger.

With reference to Figs. 2 and 5, pedestal 1 is made of two similar bodies which are preferably symmetrical about the center axis, comprising floor element 11 and pan element 12, formed of lightweight material, such as aluminum sheet, or plastic reenforced with fiber glass. As shown, the floor element 11 and pan element 12 are substantially cup shaped with flat bottoms and each is structurally reenforced by the cylinder 13 and gussets 14 in a manner well known to the structural art. Functionally the floor element 11 and pan element 12 can be cylindrically shaped but may be contoured as shown in Figs. 2 and 3 to avoid sharp edges. The pan element 12 is set over the floor element 11, bottom to bottom, with a suitable friction material 15, such as a rubber sheet fastened to the pan element 12, separating them. Band 16, made of elastic material such as rubber, surrounding the outer periphery of the floor element 11 and pan element 12, forms a flexible coupling between the elements 11 and 12. This coupling provides for liberal relative movement between the elements yet does not allow sufficient movement for them to completely separate in the event of a crash. Preferably the elastic band 16 should be formed as a continuous cylinder mounted concentrically with the floor element 11 and the pan element 12. If ease of manufacture requires it, the elastic band 16 may be replaced by a set of elastic straps mounted vertically, said set of straps girding pedestal 1, with each strap of said set joining the floor element 11 to pan element 12. Elastic band 16 is fastened to floor element 11 and pan element 12 by the fittings 17. When mounted, the elastic band 16 is stretched to produce a force pulling the pan element 12 to the floor element 11 so that a minimum force of 500 pounds in a horizontal plane against the resulting static friction should be required to displace the pan element relative to the floor piece. It has been found that a total force between 500 and 1000 pounds pull exerted by the band 16 will ordinarily provide a satisfactory assembly. This force maintains seat pedestal 1 as a rigid unit under loads associated with normal seat use, even during flight in rough air.

Fig. 5 illustrates one method of attaching the elastic band 16 to the fitting 17 which is in turn fastened to the airplane floor. Other means can be used, if desired. The fitting 17 is made up of slotted head 60 and a cylindrical stem 69 which is rotatable with respect to slotted head 60. The stem 69 terminates in button 63 which is attached to the head 60 in an undercut recess so as to permit free rotation without separation. A pin 67 is rigidly attached to the stem 69 and a hexagonal section 80 is formed on the stem to assist in rotating the stem 69.

The steel cable 62, Fig. 5, passes completely around the extremity of elastic band 16 and is held in a loop 81 formed by turning up the end of said elastic band and cementing, fastening or vulcanizing the turned end to the cylindrical surface of said elastic band. The cable 62 is exposed in notches cut in the elastic band 16 at six to twelve equally spaced locations around seat pedestal 1. In order to fasten the cable 62 to the head 60 an arcuate notch 82, with a recess at the inner end to receive the cable, is formed in the head 60 of the fitting 17. The cable is forced through the notch 82 to engage the recess at the end of the notch. The stem 69 extends through the flange 64 on the floor element 11, the fuselage floor 65 and the mounting plate 66. The mounting plate 66 is fastened to fuselage floor 65, for example by lag bolts passing through the flange 68. The pin 67 is locked in recess 71 in mounting plate 66 when the seat is attached to the floor. In order to release the seat from the floor, stem 69 is rotated 90 degrees to bring the pin 67 into alignment with slot 70 in the mounting plate which allows the fitting 17 to be removed from the mounting plate 66. So that the sleeve 16 and cable 62 remain attached to the pedestal when said rotatable fitting is disengaged from the mounting plate 66, clamps 61 are riveted to floor element 11. In this way the seat remains as an integral unit when removed from the fuselage floor.

The seat pan 23 (Fig. 2) can be fastened to the element 12 by means of similar fittings 17 and mounting plates 66 employed in the same manner as that for fastening floor element 11 to the fuselage floor, Fig. 5. The seat pan 23 has the same function as the fuselage floor in the arrangement shown in Fig. 5.

By means of this use of the fittings 17 for attachment to the fuselage floor and the seat pan, the crash loads imposed by the passenger on the elastic band 16 are transmitted directly to the fuselage floor without going through the pan element 12 and floor element 11. Distortion or collapse of the floor element 11 or the pan element 12 in a crash will not release the seat from its floor attachment, therefore. If in a crash the mounting plates 66 are displaced with respect to each other by buckling and twisting of the fuselage floor the flexible elastic band 16 will permit the fitting 17 to move with said floor plates without tearing free from said elastic band.

The seat pan piece 23, Fig. 2, is of lightweight construction, formed of sheet metal or reenforced plastic, and contoured to produce a relatively rigid structure in accordance with well-known design and fabrication procedures. In plan form, the seat pan piece 23 has the appearance shown in Fig. 6. A circular depression 24 in the seat pan piece 23, Figs. 2 and 6, is formed to provide a flat horizontal surface for convenience in coupling to the pan piece 12 and to form a recessed area to receive the mounting plates 66. This portion of the pan may be filled with an extra thickness of pan padding 25 made of foam rubber of separately sealed air cells which provides a cushion having a high elastic bulk modulus in compression. The seat padding 26 is a second layer of ordinary foam rubber or equivalent material employed in the conventional way.

In a preferred form of the invention, the seat back 5 in Figs. 1–4, is in the form of a rectangular air inflated mat 27 with the padding 28 attached to the front surface of the mat 27 to provide a seat back with conventional contours. The material from which the air inflated mat 27 is fabricated is available commercially. The material consists of two plies 73 and 74 of fabric joined by a multiplicity of closely spaced, substantially inextensible tie threads of predetermined length woven into each of the plies so that when the fabric section is inflated, the plies 73 and 74 are in substantially parallel spaced relation. The outer sides of plies 73 and 74 are coated with a thin sheet of rubber or other similar material to close the interstices in the fabric plies 73 and 74 and render them substantially fluid impervious. Valve 75 is attached to the mat at any convenient location, such for example on the back of the mat on ply 73 to provide a readily accessible position for inflation. The techniques of forming the mat and mounting the valve are known techniques. The fabric used in construction of the mat 27 is available with allowable inflation pressures of 100 pounds per square inch, but for the purpose of this invention inflation between 15 and 30 pounds per square inch is preferred. When inflated the mat 27 is firm and withstands high loads before bending. To further strengthen seat back 5 against bending loads imposed by the passenger in a crash, independent tapered side flanges 4, preferably of the same construction, are attached to mat 27 to form the I-beam section shown in the cut-away of Fig. 2.

If it is desirable to have even greater rigidity in seat back 5 than can be obtained by the aforementioned construction, the air space in the double-walled mat of said seat back 27 and side flanges 4 can be filled with plastic foam of the type currently used to fill the voids in selected portions of aircraft structure to provide increased strength. The plastic foam fills said double-wall air mat with a stiff spongy structure that will crush under the impact of a head or body blow. The crushing plastic foam cushions and absorbs at least a portion of the blow by producing a depression that conforms to the shape of the passenger body element that strikes the seat back 27 or side flanges 4.

As best seen in Fig. 2, a flap 29 attached to mat 27 and integral with seat pan 23 permits the seat back 5 to rotate around the axis A defined by the line of contact between mat 27 and seat pan 23.

The side arms 3, Fig. 1, are also preferably formed of an inflatable mat similar to seat back 5 and are covered by foam rubber 76, Fig. 2. The side arms 3 having the approximate proportions shown in Fig. 3, are attached to seat pan 23 to support them against horizontal deflection. If desired, plastic foam can be used to further strengthen side arms 3. The juncture of side arms 3 and side flanges 4 at B, Fig. 2, preferably are arcuate surfaces with the arcs being concentric about axis A, Fig. 2. This provides a uniform relation of these portions as seat back 5 assumes any of its positions from fully reclined to upright.

Positioning of the seat back 5 from fully reclined to upright can be accomplished by the positioning mechanism installed on the arcuate surface of side arms 3 and the mating surfaces on side flanges 4 as shown at location B, Fig. 2. Each side arm 3 carries a similar seat back positioning mechanism, actuated in unison by the displacement of lever 6, Figs. 1 and 2.

One such mechanism is shown in Fig. 7 wherein gears 43 are rigidly attached to shaft 45, which in turn is rotatably mounted in bearings 51 fastened to seat pan pieces 23. Channel 30, made of metal, or other material of equivalent strength, is formed to conform to the shape of the arcuate surface of side flange 4, Fig. 2. The channel is securely fastened to the arcuate surface of side flange 4 by any of the usual techniques. The channel 30 has a row of rectangular slots or openings 33 along the inner side face 32. A series of pins 34, preferably three or more, are securely attached to the arcuate surface of side arm 3. The pins 34 engage guide slots 36 in tongue 35 which slides interiorly of the channel 30 under certain conditions of use to be described. The tongue 35 carries a set of teeth 37 which correspond in face width to slots 33 in channel 30 and engage some of the slots 33 to lock the tongue 35 to the channel 30.

Slide lock 38 contained within channel 30 beside the tongue 35 has two lock protuberances 39 which can slide on smooth face 40 of tongue 35. The lower end of slide lock 38 contains a lock slot 41 and teeth 42 which form a rack and pinion combination with the gear 43. Seat pins 44, fastened to seat pan 23, Fig. 6, fit through the lock slot 41 and guide the movement of slide lock 38. Gear 43 is fixed rigidly to shaft 45 and the handle 6 is attached to the end of the shaft 45. Shaft 45 extends from the right to left side of the seat through the bearings 51 fastened rigidly to pan 23 and simultaneously operates a similar mechanism, not shown, on the right side. Since both mechanisms are operated simultaneously, the movement of handle 6 on one side of the seat will control the position of slide lock 38 on both sides of the seat and hold them in the same position relative to tongue 35 in both seat lock positioning assemblies, Fig. 7. Torsion spring 49, Fig. 2, fastened to bearing 51 and shaft 45 keeps handle 6 in a depressed position when not in use. In this way the position of seat back 5 remains fixed unless handle 6 is raised intentionally.

The seat back 5, Fig. 1, is fixed in position with respect to side arms 3 when channel 30, tongue 35, and slide lock 38 have the relative positions shown in Fig. 7. Teeth 37 in tongue 35 engage slots 33 in channel 30 and are held in engagement by the slide lock 38 with the lock protuberances 39 bearing on lands 48 on tongue 35. Because channel 30 is firmly fastened to the side flanges 4 and pins 34 are firmly attached to the side arms 3, the seat back 5 is fixed in position with respect to the seat. When a change in seat back position is desired, the handle 6 is raised. This, through the shaft 45, rotates the gears 43 on either side of the seat to move the slide lock 38 through the channel 30 until the lock protuberances 39 move into cut-outs 47 in tongue 35. With the lock 38 in this position, the pull or push on the seat back 5 by the occupant will cause the inclined faces on teeth 37 to disengage the teeth 37 from the slots 33. This action moves the tongue 35 outwardly on the guide slots 36 over the pins 34 to allow the channel 30 to move with respect to tongue 35 until the desired seat back position is obtained. Upon release of handle 6, helical spring 49 restores said handle to the depressed position raising slide lock 38 bringing lock protuberances 39 to bear on lands 48 and force tongue 35 to move inwardly so as to reengage teeth 37 in certain of the slots 33. In this way seat back 5 and side flanges 4 are locked to side arms 3 at the new position. If desired, elastic straps 77, Fig. 3, made of rubber may be attached on both sides of the seat to seat back 5 and seat pan piece 23 to assist the passenger in moving the seat back from a reclined position to a more upright position.

The seat positioning mechanism, Fig. 7, located as described will not be a crash hazard to passengers in or around the seat because of the protection afforded by the surrounding deformable elements of seat back 5, side flanges 4, and side arms 3, Fig. 2.

Fig. 8 is a schematic illustration showing the manner in which the seat in a forward facing position deforms under the load imposed by a passenger decelerating in a crash when the airplane strikes an obstacle nose foremost. Under these conditions the passenger slides forward in the seat and tightens against the safety belt. The passenger restraining load on the seat belt is transmitted through the elastic band 16 to the airplane floor. The elastic band 16 stretches around the surfaces of the floor element 11 and the pan element 12, whose smooth contours prevent the development of stress concentrations in said elastic band. In one application of the invention, the elastic band 16 is proportioned to permit an eight inch movement of the seat pan with respect to the floor element 11 under the load imposed by a 200-pound passenger in a 20 g. crash deceleration sustained for 0.10 second. Measurements made in the full-scale crashes show that this load corresponds to a crash severe enough to destroy much of the airplane structure. If the elastic band 16 is made of common rubber, having an ultimate tensile strength of 5000 pounds per square inch, a thickness of ¼ inch will suffice to support the 20 g. load. The mechanical damping provided by friction surface 15 between the floor element 11 and the pan element 12, Fig. 2, should be correlated with the elastic system so that the seat returns approximately to its normal position without vibration when the crash load subsides.

It is desirable that the weight of the seat components above the floor element 11, Fig. 8, be as light as possible to reduce the seat belt force on the passenger when he strains against the seat belt in a crash and accelerates the seat parts above the floor element 11 in the direction of his motion.

Fig. 9 is a schematic illustration showing the manner in which the seat deforms when the crash blow comes from the rear, as may occur when the airplane swings around in the crash, or if the seat is used in a normally rearward facing position and the crash blow comes from the front of the plane. Upon crash impact, the passenger moves the seat pan back with respect to the floor element 11 with the elastic band 16 limiting the movement and returning the seat pan to its normal position in a manner similar to that previously described.

In the preferred form of the invention the elements of seat pedestal 1, Fig. 2, are formed as surfaces of revolution about a vertical axis so that the seat pedestal will deform approximately as shown in Figs. 8 and 9, regardless of the horizontal direction from which the crash blow comes. Cushioning of vertical crash loads is provided by the double thickness of resilient material of the padding 25 and 26 on seat pan piece 23, Fig. 2.

Seats for use where impact loads greater than 20 g are probable may require stronger side flanges 4, Fig. 1, than can be obtained with air mat inflated to safe pressures, or air mat filled with foam plastic. Such additional stiffening of the side flanges 4, for example, may be accomplished with a modest increase in weight by means of tube assemblies 84 having telescoping tubes 78 and 79 as shown in Fig. 2 at the juncture of both sides of the seat back 5 and side flanges 4. The tubes 84 help to support the seat back 5 and side flanges 4 against buckling under the load imposed by a passenger receiving a crash blow from the rear. By locating the tubes 84 at the juncture of seat back 5 and side flanges 4, and by setting the upper end of each of the tube assemblies 84 a substantial distance below the top of the seat back 5, the chance of passenger contact with either of the tubes is materially reduced. Likewise, because tubes 78 and 79 telescope a direct blow from above will cause tube 78 to slide into tube 79 against the action of spring 72 and prevent injury to the passenger and damage to the seat.

While certain representative embodiments and details have been shown for the purpose of illustrating the invention, it will be apparent to those skilled in this art that various changes and modifications may be made without departing from the spirit or scope of the invention, as defined by the subjoined claims.

I claim:

1. In a seat structure having a seat and seat back adapted to absorb substantial shock caused by crash blows; said back member comprising a mattress, said mattress comprising two spaced, generally parallel sheets, a plurality of substantially inextensible cord members connecting said sheets, said sheets being air impervious, the space between said sheets being adapted to receive air under pressure, side members placed transversely of said back member, each of said side members comprising a mattress, and a telescoping stiffening tube at the juncture of said back with each of said side members.

2. The apparatus of claim 1, said mattresses being filled with plastic foam.

3. In a seat structure having a seat and seat back adapted to absorb substantial shock caused by crash blows; a seat back member, a flange member attached to each side of said seat back, said back and flange members each embodying an inflatable fabric chamber having two plies of substantially fluid impervious fabric disposed in spaced substantially parallel relation to each other in the inflated condition and joined together by a plurality of substantially inextensible tie threads woven into each of the plies, and a telescoping stiffening tube at each juncture of said back and flange members.

4. The apparatus as claimed in claim 3 in which the inflatable chambers are filled with plastic foam.

5. In a seat structure having a seat and seat back adapted to absorb substantial shock caused by crash blows; a seat back member, seat back side flanges attached to the opposite side edges of the seat back to form an integral back structure, a pair of telescoping stiffening tubes at each juncture of said seat back and side flanges, the seat back and side flanges each being an inflatable chamber embodying a pair of substantially fluid impervious fabric plies disposed in spaced substantially parallel relation in the inflated position and joined together by a plurality of substantially inextensible tie threads woven into each of the plies.

References Cited in the file of this patent

UNITED STATES PATENTS 2,325,223    Brewster _____ July 27, 1943